United States Patent [19]

Peterson

[11] Patent Number: 4,490,987
[45] Date of Patent: Jan. 1, 1985

[54] VEHICLE AIR CONDITIONING SYSTEM

[75] Inventor: Gregory E. Peterson, Pontiac, Mich.

[73] Assignee: General Motors Corporation, Detroit, Mich.

[21] Appl. No.: 557,757

[22] Filed: Dec. 5, 1983

[51] Int. Cl.³ .............................................. F25D 17/08
[52] U.S. Cl. .................................... 62/186; 62/228.3; 62/323.4
[58] Field of Search .................... 62/186, 228.3, 323.4; 165/43

[56] References Cited

U.S. PATENT DOCUMENTS

| | | | |
|---|---|---|---|
| 3,064,444 | 11/1962 | Kyle | 62/228.3 X |
| 3,633,830 | 1/1972 | Pellizzetti | 62/228.3 X |
| 3,802,490 | 4/1974 | Jacobs | 165/23 |
| 4,320,628 | 3/1982 | Okajima | 62/186 |
| 4,337,818 | 7/1982 | Franz | 62/323.4 X |
| 4,414,820 | 11/1983 | Morris | 62/228.3 X |

Primary Examiner—William E. Tapolcai
Attorney, Agent, or Firm—R. L. Phillips

[57] ABSTRACT

A vehicle air conditioning system is disclosed having a compressor discharge pressure regulated inside air recirculation rate.

2 Claims, 2 Drawing Figures

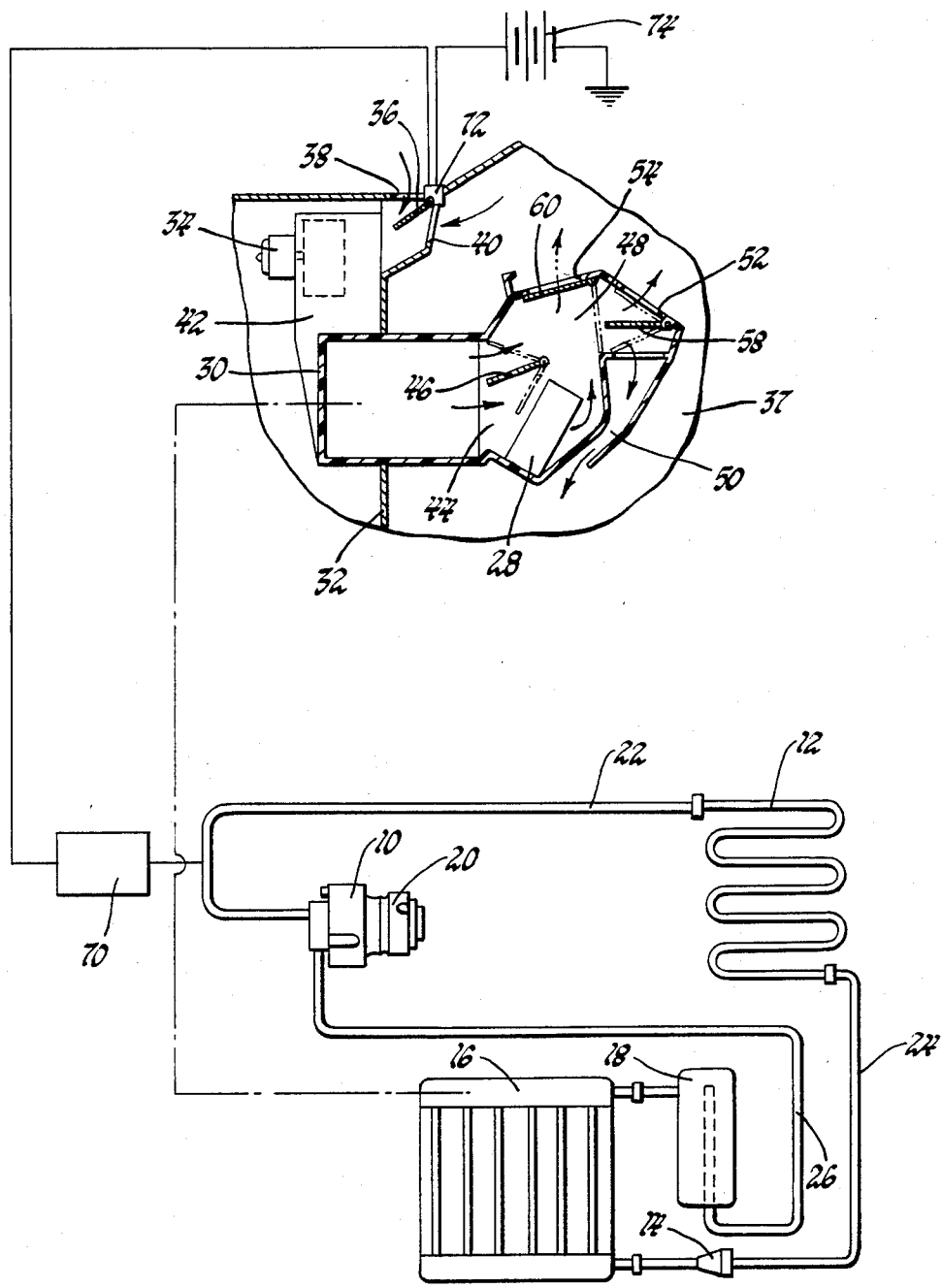
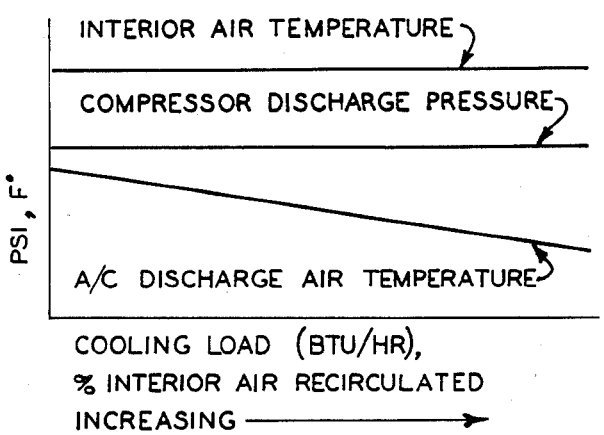
Fig. 1
Fig. 2

VEHICLE AIR CONDITIONING SYSTEM

This invention relates to vehicle air conditioning systems and more particularly to the control therein of inside and outside air supply.

Conventional vehicle air conditioning systems typically incorporate both an outside air supply and an inside or recirculating air supply. However, these air supplies or sources are independent and discrete and have accompanying disadvantages along with the various advantages which they offer over each other. For example, the advantages of inside or interior air supply as compared with outside or exterior air supply include lower air conditioning discharge air temperatures, faster interior cool down, and reduced air conditioning compressor discharge gas pressures and temperatures as well as reduced parasitic engine loading which contributes to increased fuel economy during compressor operation. However, the recirculation of inside air has certain disadvantages as compared to using outside air including elevated interior noise level and degradation of air conditioning discharge air quality leading to reduced long term inside air quality.

In the design of such systems, it is therefore an objective in using both an inside and outside air supply to maximize their various advantages while minimizing their disadvantages. This can be achieved to various degrees by utilizing a variable inside/outside air mix door controlled by various sensors sensing such possible control parameters as instantaneous wet and dry bulb temperatures and compressor capacity. This, however, is complex and costly and, as a result, the typical practice is to automatically adjust the air mix door to a certain fixed setting in both maximum and normal air conditioning modes. For example, in the maximum air conditioning mode the air mix door may be set to recirculate 80% inside air and mix same with 20% outside air throughout this mode but in the normal mode be set so as to eliminate any inside air recirculation and effect 100% outside air usage throughout this mode.

The present invention quite simply incorporates the best features of both inside and outside air supply without a complex and costly air mix control system. Instead of requiring various sensors, the present invention utilizes an air conditioning system pressure controlled feedback loop that varies the inside and outside air mix. In the preferred embodiment, this is simply accomplished with a pressure transducer mounted on the high pressure or discharge side of the engine driven air conditioning compressor. The transducer senses the compressor head pressure (condensing pressure) and sends a variable electrical signal to an electrically powered actuator which operates the air mix door through its full range of travel ( 0–100% inside or outside air). The air mix control system operates on the principle that the compressor head pressure (condensing pressure) reflects both ambient conditions (wet bulb temperature and dry bulb temperature) and also vehicle speed and thereby instantaneous compressor-condenser capacity. And this is utilized to control the air mix door so as to increase the percentage of inside air that is recirculated with increasing cooling load until the desired compressor head pressure or condensing pressure level is reached. Thus, it will be appreciated that the maximum compressor head pressure is positively controlled which has the effect of increasing compressor durability and fuel economy. In contrast, the compressor head pressure would be unregulated with a temperature sensing system. Other advantages include automatic regulation of inside air temperature and also air conditioning discharge air temperature.

These and other advantages, features and objectives of the present invention will become more apparent from the following description and drawing in which:

FIG. 1 is a schematic of a vehicle air conditioning system incorporating the present invention.

FIG. 2 is a plot of typical operating characteristics of the air conditioning system in FIG. 1 as produced by the present invention.

Referring to FIG. 1, there is shown a vehicle air conditioning system generally comprising a compressor 10, condenser 12, expansion tube (orifice) 14, evaporator 16 and an accumulator-dehydrator 18. The compressor has an electromagnetic clutch 20 by which it is selectively driven by the vehicle's engine (not shown) and discharges refrigerant in the form of hot high pressure vapor to a discharge line 22 connected to the condenser 12. The condenser is in turn connected to a liquid line 24 that conveys the refrigerant now in the form of cold high pressure liquid to the expansion tube 14 which is connected to the evaporator 16. The evaporator 16 is connected to the accumulator-dehydrator 18 which is in turn connected by a suction line 26 that conveys the refrigerant now in the form of cold low pressure vapor back to the compressor at its intake or suction side. The evaporator 16 together with a heater 28 is mounted in a housing 30 on the vehicle's fire wall 32. An electric motor driven blower 34 provides for forced circulation through the various ducting associated with the evaporator and heater, such ducting including an air mix door 36 which admits outside air from the atmosphere and/or inside air from the vehicle's occupant space 37 through inlets 38 and 40, respectively, to a duct 42 leading to the evaporator 16. Air exits the evaporator to a duct 44 where it is directed through and/or around the heater 28 by a temperature door 46. Air from the evaporator 16 and/or the heater 28 is delivered past the door 46 to a cold-hot mixing temperature control region 48 from which it may be delivered to the interior 37 of the vehicle via a heat duct 50, an air conditioning duct 52 and a defroster duct 54, such admission of the air conditioning discharge air to the heater duct and the air conditioning duct being under the control of a door 58 and the admission through the defroster duct being under the control of a door 60. The automotive air conditioning system thus far described is conventional and operates to deliver cooled air to the occupant space under the control of a conventional control system (not shown) and in a conventional manner except for the provision of the air mix door control about to be described. In the conventional system, the air mix door 36 which may be also be referred to as an outside/inside air mix door is normally automatically adjusted to a certain fixed setting in both a maximum and a normal air conditioning mode. As previously mentioned, in the maximum air conditioning mode, the air mix door may be set to circulate for example 80% inside air and mix same with 20% outside air throughout this mode. On the other hand, in the normal mode the air mix door may be set so as to eliminate any inside air recirculation and effect 100% inside air usage throughout this mode. In both the air conditioning modes, temperature control of the air delivered to the occupant space is obtained with the air temperature door 46 which is adjustable to apportion the amount of cooled inside-outside air through the evaporator 16 that is delivered directly to the temperature control region 48 and indirectly thereto through the heater 28 through which hot engine coolant is continuously circulated.

According to the present invention, there is provided an air conditioning system pressure control feedback loop that varies the inside and outside air mix so as to utilize the best features of both the inside and outside air supply without a complex and costly air mix control system. In the preferred embodiment shown, this is simply accomplished with a pressure transducer 70 that is mounted on the high pressure or discharge side of the engine driven air conditioning compressor 10 at the discharge line 22. The transducer 70 senses the compressor head pressure which is also the condensing pressure and delivers a variable electrical signal to an electrically powered actuator 72 which is powered from a DC power source 74 such as the vehicle's battery and is connected to operate the air mix door 36 through its full range of travel (0-100% inside or outside air) in response to the head pressure signal as will now be described. The air mix control of the present invention operates on the principle that the compressor head pressure (condensing pressure) reflects both ambient conditions (wet bulb temperatures and dry bulb temperatures) and also vehicle speed and thereby instantaneous compressor-condenser capacity. This is utilized in the electrical signal from the head pressure transducer 70 to the actuator 72 to control the air mix door 36 so as to increase the percentage of air that is recirculated with increasing cooling load until the desired compressor discharge or condensing pressure level is reached. This may be better understood with reference to FIG. 2 where there is shown a plot of typical operating characteristics of the air conditioning system in FIG. 1 as produced by the air mix control of the present invention. In arriving at these results, it will be appreciated that the air conditioning system operates at the evaporator to actually cool a mixture comprising outside air having one wet and dry bulb temperature characteristic and recirculated air from the inside having another wet and dry bulb characteristic. The air mixing means comprised of 36, 38, 40, 70, 72, 74 operates in response to the pressure of the refrigerant discharged by the compressor in a feedback loop which reflects both the resultant wet and dry bulb temperature characteristic of the inside and outside air and the speed of the power source (compressor capacity) to vary the relative amounts of outside and inside air in the air mixture before the same is circulated to the evaporator. And it is this varying of the relative amounts of outside and inside air which acts to limit the compressor discharge pressure by increasing the percentage of inside air that is recirculated in the air mixture to thereby decrease the temperature of the mixture as the cooling load of the air circulating in the vehicle increases. This is quite advantageous as compared, for example, to a temperature sensing system where the compressor head pressure is unregulated. Moreover, it will be appreciated that the positively controlled maximum compressor discharge pressure effected by the present invention will increase compressor durability and also fuel economy. On the other hand, automatic regulation of both the inside air temperature and the air conditioning discharging air temperature is provided with a simple, objective feedback system.

The above described preferred embodiment is illustrative of the invention which may be modified within the scope of the appended claims.

The embodiments of the invention in which an exclusive property or privilege is claimed are defined as follows:

1. An air conditioning system for cooling the inside of a vehicle with a mixture of inside air and outside air cooled by a refrigerant system having an engine driven compressor characterized by air mixing means responsive to the pressure of the refrigerant discharged by the compressor for varying the relative amounts of outside and inside air that are mixed so as to limit the compressor discharge pressure to a predetermined level and also thereby regulate the inside air temperature wherein the mixture temperature decreases and the percentage of inside air recirculated increases with increasing cooling load.

2. An air conditioning system for cooling and temperature regulating the variable cooling load of circulating air in a vehicle with a mixture of outside air having one wet and dry bulb temperature characteristic and recirculating inside air having another wet and dry bulb temperature characteristic which mixture has a resultant wet and dry bulb temperature characteristic and is cooled by an evaporator in a closed refrigerant circuit including a condenser and a refrigerant compressor driven by a variable speed power source to pump refrigerant from said evaporator to said condenser, said system characterized by air mixing means for circulating an air mixture to said evaporator and responsive to the pressure of the refrigerant discharged by the compressor in a feedback loop which reflects said resultant wet and dry bulb temperature characteristic and the speed of said power source to vary the relative amounts of outside and inside air in said air mixture before the air mixture is circulated to said evaporator thereby to limit the compressor discharge pressure to a predetermined level, the varying of said relative amounts of outside and inside air acting to limit said compressor discharge pressure by increasing the percentage of inside air recirculated in said air mixture thereby to decrease the temperature of said mixture as the cooling load of air circulating in the vehicle increases.

* * * * *